United States Patent [19]

Hanson

[11] Patent Number: 4,598,588

[45] Date of Patent: Jul. 8, 1986

[54] DETACHED ROCK EVALUATION DEVICE

[75] Inventor: David R. Hanson, Golden, Colo.

[73] Assignee: The United States of America as represented by the Secretary of Interior, Washington, D.C.

[21] Appl. No.: 693,510

[22] Filed: Jan. 22, 1985

[51] Int. Cl.⁴ .............................................. G01H 1/14
[52] U.S. Cl. ......................................... 73/584; 73/594
[58] Field of Search .................. 73/584, 588, 594, 658

[56] References Cited

U.S. PATENT DOCUMENTS

| 3,361,225 | 1/1968 | Nichols | 73/588 |
| 3,531,983 | 10/1970 | Heath et al. | 73/584 |
| 4,150,576 | 4/1979 | Tarpley, Jr. | 73/594 |

Primary Examiner—Stephen A. Kreitman
Attorney, Agent, or Firm—Thomas Zack; E. Philip Koltos

[57] ABSTRACT

A rock detachment evaluation device (10) having an energy transducer unit (11) for sensing vibrations imparted to a subject rock (172) for converting the sensed vibrations into electrical signals, a low band pass filter unit (12) for receiving the electrical signal and transmitting only a low frequency segment thereof, a high band pass filter unit (13) for receiving the electrical signals and for transmitting only a high frequency segment thereof, a comparison unit (14) for receiving the low frequency and high frequency signals and for determining the difference in power between the signals, and a display unit (16) for displaying indicia of the difference, which provides a quantitative measure of rock detachment.

9 Claims, 2 Drawing Figures

4,598,588

DETACHED ROCK EVALUATION DEVICE

TECHNICAL FIELD

This invention relates generally to devices suitable for use in determining mine rock detachment.

BACKGROUND ART

There has long existed a need for a reliable device capable of objectively determining rock detachment in mines. In 1979 and 1980 alone, ninety eight fatalities and 2,344 injuries resulted from falls of roof, rib or face rock in underground coal mines. Such casualties could either be substantially reduced or eliminated through the availability of such a device.

In the past, rock detachment has been determined by tapping the rock in question with a scaling or sounding bar and listening to the resulting sounds. The lower the pitch of the detected sound, the less stable the rock. Though reasonably effective, this method proves highly subjective in application. Factors such as inexperience, inability to properly hear the rock response, the miner's health, near-by noise, obscuring dust and simple human carelessness tend to degrade one's ability to ojectively distinguish between stable and unstable rocks.

Attempts have been previously made to develop an objective method of detecting mine rock detachment. For instance, one prior art researcher determined that detached rocks vibrate at lower frequencies and for a longer time than do solid rocks when struck with a hammer or sounding bar. Others attempted to develop an instrument which would give a numerical measure of rock conditions based upon this vibrational behavior, but this effort later became abandoned.

Other prior art researchers have considered the vibrational behavior of mine rock and have confirmed that solid rocks tend to have a broad band, noise like spectrum. This response becomes greatly enhanced in the frequency range of 0 to 1,000 hertz as rock detachment increases. Again, this research failed to provide a device for ensuring an objective measure of rock detachment.

There therefore exists a need for a detached rock evaluation device that will provide an objective quantitative measure of mine rock detachment. Such a device should be relatively simple to use and durable of construction, and should be reliable and accurate in typical mine environments.

DISCLOSURE OF INVENTION

These and other needs are substantially met by provision of the detached rock evaluation device disclosed herein. This device includes generally an energy transducer unit, a low band pass filter unit, a high band pass filter unit, a comparison unit and a display unit.

The energy transducer unit may be comprised of an accelerometer or the like that may be held against the rock to be tested. When the rock is struck with an appropriate impactor, the resulting vibrations in the rock will be detected by the accelerometer and converted into an electric signal having a frequency proportional to the vibrations detected. This signal can be buffered and amplified through an automatic gain control amplifier in the energy transducer unit.

The resulting signal may then be directed to both the low band pass filter unit and the high band pass filter unit. The low band pass filter unit includes a low band pass filter that serves to pass only signals falling within the range of 500 to 1,000 hertz. These signals may then be amplified, squared and integrated. Similarly, the high band pass filter unit has a filter that will pass only signals in the 3,000 to 3,500 hertz range. These signals will then be similarly amplified, squared and integrated.

Signals from both band pass filter units are then directed to the comparison unit, which includes a differential amplifier for comparing the relative amplitude of the two signals. The output of the comparison unit can then be appropriately displayed on the display unit, which can be formed of a liquid crystal display unit.

In solid rock, the vibration established in the rock by striking it with the impactor will be of essentially equal amplitude across the relevant frequency range. As a result, the comparison unit will detect little difference between the amplitude of the signal provided by the low band pass filter unit as versus the signal provided by the high band pass filter unit. This being the case, a relatively small number, representing a relatively small difference, will be displayed on the display unit.

In the alternative, the more detached a rock becomes, the greater the amplitude of the vibration in the rock at low frequencies. As a result, the comparison unit will detect a greater difference in the amplitude between the signal provided by the low band pass filter unit as versus the high band pass filter unit. This will result in a larger number being displayed on the display unit. The larger the difference, and hence, the larger the number on the display unit, the greater the detachment.

BRIEF DESCRIPTION OF THE DRAWINGS

These and other attributes of the invention will become more clear upon a thorough review and study of the following description of the best mode for carrying out the invention, particularly when reviewed in conjunction with the drawings, wherein.

BEST MODE FOR CARRYING OUT THE INVENTION

Figure 1:
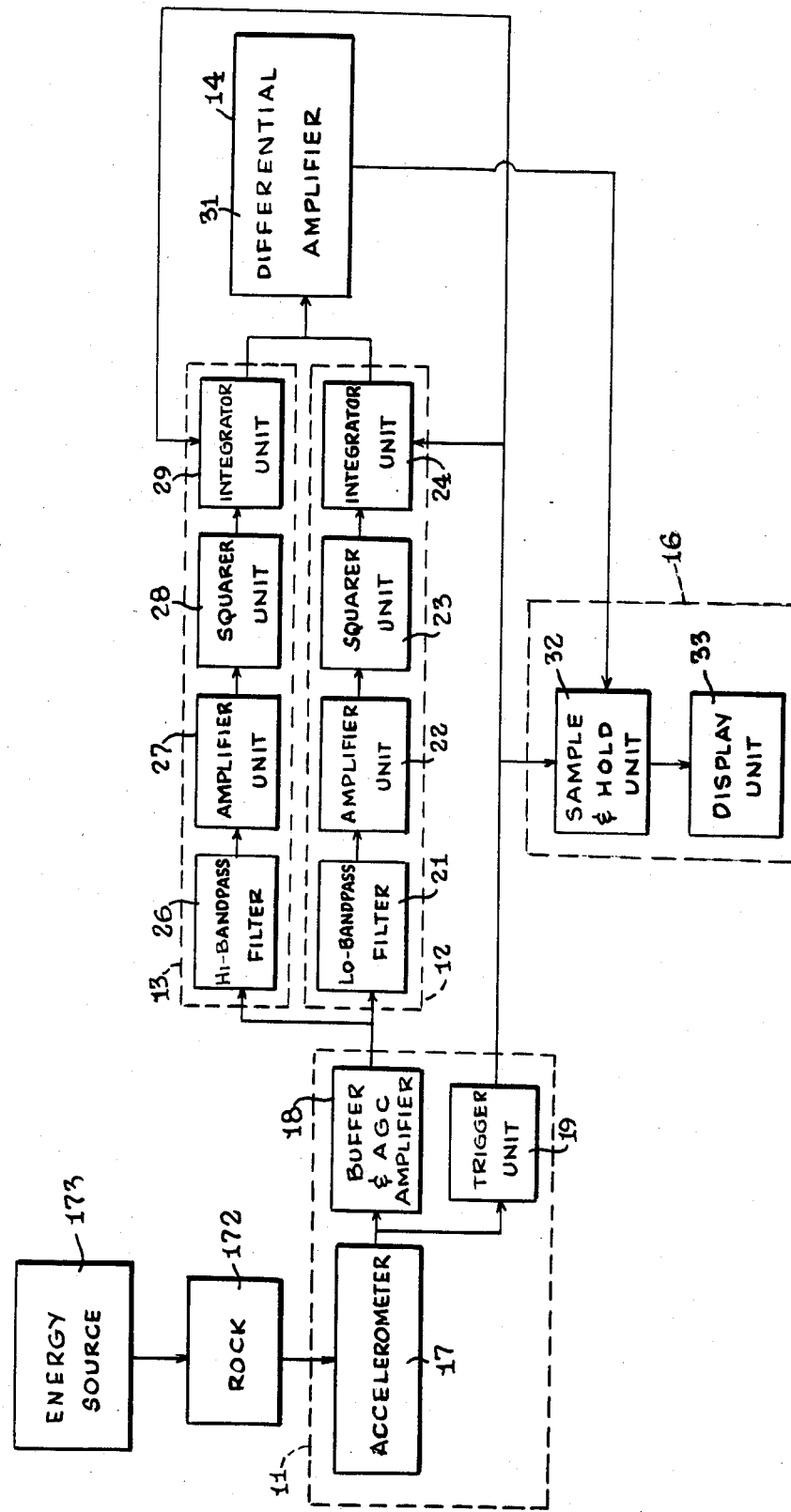
FIG. 1 comprises a block diagram view of the device.

Referring now to the drawings, and in particular to FIG. 1, the device may be seen as depicted generally by the numeral 10. The device (10) includes generally an energy transducer unit (11), a low band pass filter unit (12), a high band pass filter unit (13), a comparison unit (14) and a display unit (16).

More particularly, the energy transducer unit (11) includes generally an accelerometer (17), a buffer and automatic gain control amplifier (18) and a trigger unit (19). The low band pass filter unit (12) includes generally a low band pass filter (21), an amplifier (22), a squarer (23) and an integrater (24). The high band pass filter unit (13) includes generally a high band pass filter (26), an amplifier (27), a squarer (28) and a integrater (29). The comparison unit includes generally a differential amplifier (31). Finally, the display unit (16) includes generally a sample and hold unit (32) and a liquid crystal display (33). Each of these generally described components will now be described in more detail in seriatim fashion.

ACCELEROMETER

Figure 2:
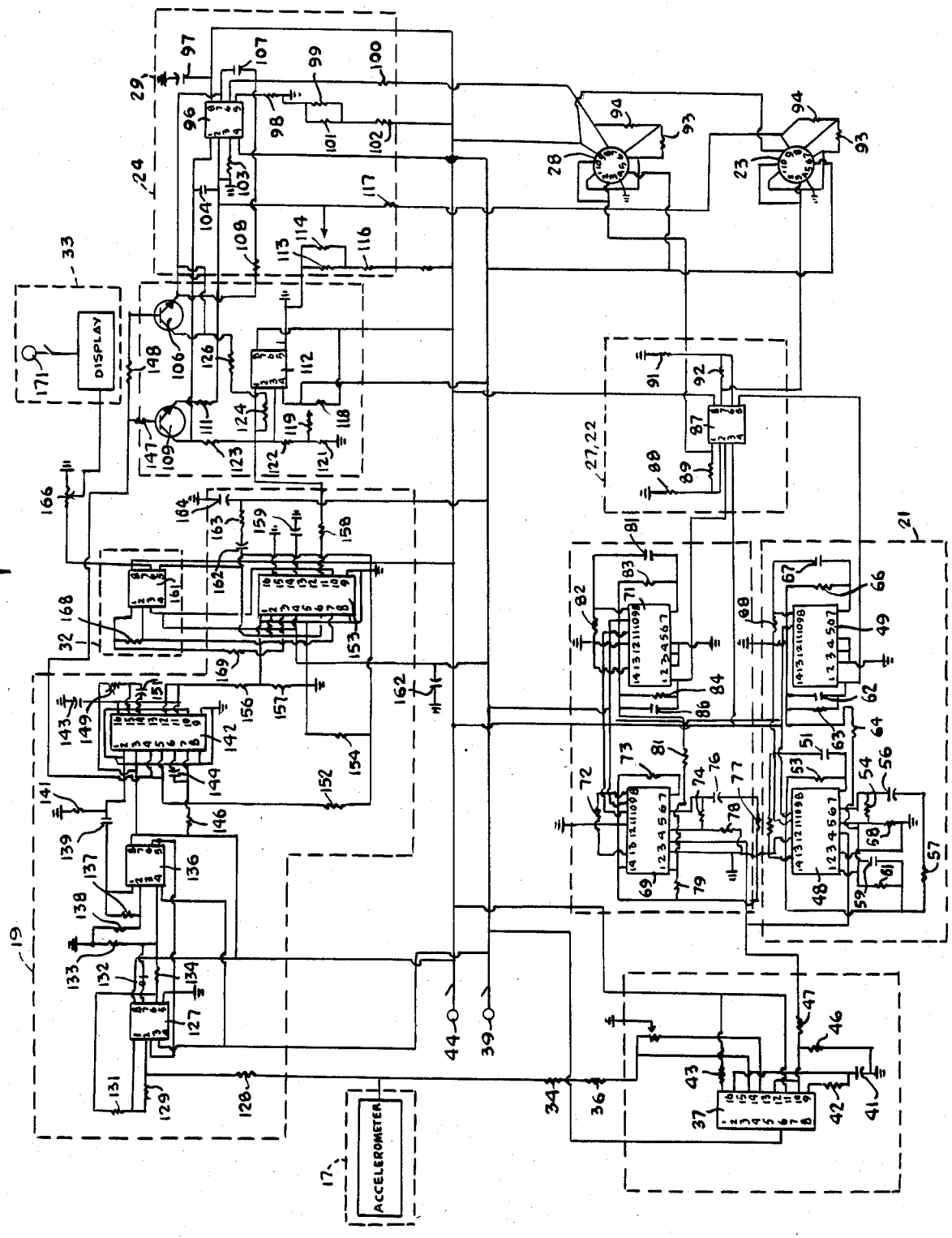
FIG. 2 comprises a schematic diagram of the device.

Referring now to FIG. 2, the accelerometer (17) may be provided through use of a Dunegan/Endevco model No. 2219E accelerometer.

AGC AMPLIFIER

The output of the accelerometer (17) connects through a series connected 10K ohm resistor (34) and a 240K ohm resistor (36) to pin 14 of a transconductance amplifier (37) (such as National part number LM13600AN) contained in the buffer and automatic gain control amplifier unit (18).

The two above mentioned serially connected resistors (34 and 36) also connect through a 50K ohm variable resistor (38) to pin 13 of the transductance amplifier (37). The variable leg of the variable resistor (38) connects to ground. Pin 6 of the transductance amplifier connects to a negative 12.6 volt source (39), pin 15 connects through a 1 microfarad electrolytic capacitor (41) to ground, and pin 9 connects through a 47 ohm resistor (42) to pin 15. Pin 16 connects through a 100K ohm resistor (43) to a positive 12.6 volt source (44), which source (44) also connects to pin 11. Finally, pins 10 and 12 are connected in common and through a 510K ohm resistor (46) to ground and through a 470K ohm resistor (47) to the low band pass and high band pass filters (21 and 26).

LOW BAND PASS FILTER

The low band pass filter (21) includes two Burr-Brown part number UAF-41 universal active filters (48 and 49). Pin 10 of both universal active filters (48 and 49) connect to the positive 12.6 volt source (44). Pin 9 of both universal active filters (48 and 49) connect to the negative 12.6 volt source (39).

Referring now to the first universal active filter (48), pin 8 connects through a 8200 pico Farad capacitor (51) to pin 7, and also through a 20K ohm resistor (52) to pin 13. Pin 7 connects through a 20K ohm resistor (53) to pin 14. Pin 6 connects through a 2K ohm resistor (54) to pin 5 and through a serially connected 1 microfarad electrolytic capacitor (56) and 72K ohm resistor (57) to pin 14. Pin 5 connects through a 2K ohm resistor (58) to ground. Pin 4 connects to the output of the buffer and automatic gain control amplifier (18) and pin 3 connects to ground. Pin 1 connects through a parallel connected 8200 picofarad capacitor (59) and a 72K ohm resistor (61) to pin 14. Finally, pin 11 connects to ground.

The second universal active filter (49) in the low band pass filter unit (21) has pin 1 connected through a parallel connected 8200 picofarad capacitor (62) and 107K ohm resistor (63) to pin 14 and through a 107K ohm resistor (64) to pin 1 of the first universal active filter (48). Pins 3, 4, 5 and 11 connect to ground. Pin 7 connects through a 30K ohm resistor (66) to pin 14, and through a 8200 picofarad capacitor (67) to pin 8. Pin 8 connects through a 30K ohm resistor (68) to pin 13.

HIGH BAND PASS FILTER

The high band pass filter (26) is similarly constructed of two universal active filters (69 and 71). Both of these universal active filters (69 and 71) have pins 3 and 11 connected to ground. In addition, pin 10 of the first universal active filter (69) connects to pin 10 of the second universal active filter (71) to the positive 12.6 volt source (44), and pin 9 of the first filter (69) connects to pin 9 of the second filter (71), to the negative 12.6 volt source (39).

With respect to the first universal active filter (69), pin 8 connects through a 47K ohm resistor (72) to pin 13, pin 7 connects through a 47K ohm resistor (73) to pin 14, pin 6 connects through a 2K ohm resistor (74) to pin 5 and through a serially connected 1 microfarad electrolytic capacitor (76) and 2 mega ohm resistor (77) to pin 14. Pin 5 connects through a 2K ohm resistor (78) to ground. Pin 4 connects to the output of the buffer and automatic gain control amplifier (18). Pin 1 connects through a 680K ohm resistor (79) to pin 14 and through a 82K ohm resistor (81) to pin 14 of the second universal active filter (71) of the high band pass filter (26).

In addition, pin 8 of the second universal active filter (71) connects through a 8200 picofarad capacitor (80) to pin 7 and through a 5.1K ohm resistor (82) to pin 13. Pin 7 connects through a 5.1 kilo ohm resistor (83) to pin 14. Pins 4 and 5 connect to ground and pin 1 connects through a parallel connected 82K ohm resistor and 8200 picofarad capacitor (84 and 86) to pin 14, as well as to an amplifier (27) described below.

So configured as described above, the low band pass filter (21) will only permit signals in the frequency range of 500 to 1,000 hertz to pass therethrough. The high band pass filter (26) will only permit signals in the frequency range of 3,000 to 3,5000 hertz to pass therethrough.

AMPLIFIERS

The amplifier (22 and 27) for both the low band pass and high band pass filters may be provided through use of a dual operational amplifier (87) such as a National part number LF442CN. Pin 4 of this part (87) connects to the negative 12.6 volt source (39) and pin 8 connects to the positive 12.6 volt source (44). Non-inverting input pin 3 connects to pin 1 of the second universal active filter (71) of the high band pass filter (26). Non-inverting input pin 5 connects to pin 1 of the second universal active filter (49) of the low band pass filter (21). Pin 2 connects through a 5.1K ohm resistor (88) to ground and through a 51K ohm resistor (89) to pin 1. Similarly, pin 6 connects through a 5.1K ohm resistor (91) to ground and through a 51K ohm resistor (92) to pin 7.

SQUARERS

The output of pin 1 of the amplifier part (87) connects to pin 3 of a squarer (28). The output of pin 7 of the amplifier part (87) connects to pin 3 of a second squarer (23). Both squarers (28 and 23) may be provided through use of Analog Device part number AD534KH. Both squarers have pins 1, 4 and 6 connected to ground. Pin 6 connects to pin 7 through a 10K ohm resistor (93) and pin 7 connected to pin 8 through a 27K ohm resistor (94). In addition, pin 3 connects to pin 10 and pin 9 from the first squarer (28) connects to pin 9 of the second squarer (23) and to the positive 12.6 volt source (44). Pin 8 of each squarer (28 and 23) connects through 1 mega ohm resistors (100 and 117) to the inverting inputs (pin 6 and pin 2) of a second dual operational amplifier (96) that comprises both integraters (24 and 29). Pin 5 on each squarer (28 and 23) connects to the negative 12.6 volt source (39).

INTEGRATERS

Pin 4 of the dual operational amplifier (96) connects to the negative 12.6 volt source (39) and pin 8 connects to ground through a 220 microfarad electrolytic capacitor (97) and to the positive 12.6 volt source (44). Pin 5 connects to ground through a 1 mega ohm resistor (98). Pin 6 connects to the variable leg of a 200K ohm variable resistor (99) that connects in parallel with a 33 ohm resistor (101) between ground and a 10K ohm resistor (102) that connects to the positive 12.6 volt source (44). Pin 3 connects to ground through a 1 mega ohm resistor (103) and pin 2 connects to pin 1 through a 0.22 microfarad capacitor (104). Pin 7 connects to the collector of a first 2N2222A transistor (106), and also through a series connected 0.22 micofarad capacitor (107) and 100 ohm resistor (108) to the emitter of that same transistor (106). The junction of the 0.22 microfarad capacitor (107) and 100 ohm resistor (108) is connected to pin 6 of the amplifier (96) described above. Pin 1 connects to the collector of a second 2N2222A transistor (109). Pin 2 connects through a 100 ohm resistor (111) to the emitter of that second transistor (109). Pin 2 also connects through the variable leg of a 200K ohm resistor (114) that connects in parallel with a 33 ohm resistor (113) between ground and a 10K ohm resistor (116) that connects to the positive 12.6 volt source (44).

DIFFERENTIAL AMPLIFIER

The differential amplifier includes yet another dual operational amplifier (112). Pin 4 of this part (112) connects to the negative 12.6 volt source (39) and pin 8 connects to the positive 12.6 volt source (44). Pins 5 and 6 connect to ground.

Pin 4 connects through a variable 20K ohm resistor (118) to the positive 12.6 volt source (44). The variable leg of this resistor (118) connects through a 20K ohm resistor (119) to a voltage divider network comprising a grounded 10K ohm resistor (121) and a 10K ohm resistor (122) that connects to pin 3 of the dual operational amplifier (112) and through a 5.1K ohm resistor (123) to the collector of the second transistor (109). Pin 2 of the dual operational amplifier (112) connects through a 10K ohm resistor (124) to pin 1 and through a 5.1K ohm resistor (126) to the collector of the first transistor (106).

TRIGGER UNIT

The energy transducer unit (11) noted above with respect to FIG. 1 includes a trigger unit (19). The trigger unit (19) will now be described in detail. The output of the accelerometer (17) connects to the inverting input (pin 2) of yet another dual operational amplifier (127) through a 10K ohm resistor (128). Pin 4 of the dual operational amplifier (127) connects to the negative 12.6 volt source (39) and pin 8 connects to the positive 12.6 volt source (44). Pins 3 and 5 connect to ground and pin 2 connects to pin 1 through a 3 mega ohm resistor (129). Pin 2 also connects to pin 6 through a 10K ohm resistor (131). Pin 7 connects through a 1N914 diode (132) to a grounded 10K ohm resistor (133). Pin 6 connects through a 3K ohm resistor (134) to pin 3 of yet another dual operational amplifier (136).

Pin 4 of the latter dual operational amplifier (136) connects to the negative 12.6 volt source (39) and pin 8 connects to the positive 12.6 volt source (44). Pins 5 and 6 of this dual operational amplifier (136) connects to ground. Pin 2 connects through a 470K ohm resistor (137) to pin 1 and through a 10K ohm resistor (138) to ground. Pin 1 connects through a 0.0033 microfarad capacitor (139) to a grounded 470K ohm resistor (141) and to pin 2 of a dual one shot (142).

The dual one shot (142) may be provided through use of a National part number MM74C221. Pins 1, 8 and 9 are connected to ground. Pin 11 connects to ground through a 1.5 microfarad electrolytic capacitor (143) and to pin 16. Pin 7 connects to pin 6 through a 0.68 microfarad electrolytic capacitor (144) and through a 100K ohm resistor (146) to the positive 12.6 volt source (44). Pin 4 connects through a 15K ohm resistor (147) to the base of the second transistor (109) described above with respect to the differential amplifier (31) and through a second 15K ohm resistor (148) to the base of the first transistor (106). Pin 3 connects to the positive 12.6 volt source (44). Pin 2 connects to pin 10. Pin 3 connects through a 150K ohm resistor (149) to pin 15 and to pin 14 through a 0.68 microfarad capacitor (151).

Finally, pin 5 connects through a 10K ohm resistor (152) to pin 16 of an analog switch (153) such as National part number 13201N, and through a 6.8K ohm resistor (154) to pin 5 thereof and ground. Pin 12 of the dual one shot (142) connects through a 10K ohm resistor (156) to pin 1 of the analog switch (153) and through a 6.8K ohm resistor (157) to ground. Pin 1 of the analog switch (153) also connects to pin 8 and pin 9. Pin 4 connects to the negative 12.6 volt source (39). Pin 5 and 15 of the analog switch (153) connect to ground. Pin 11 connects through a 5.1K ohm resistor (158) to pin 1 of the dual operational amplifier (112) contained in the differential amplifier unit (31). Pin 13 connects to the positive 12.6 volt source (44) and through an electrolytic 1.5 microfarad capacitor (159) to ground. Pin 10 connects to pin 14 and to pin 3 of a dual operational amplifier (161) contained in the sample and hold unit (32) described below. Pin 4 connects to the negative 12.6 volt supply (39) and also to ground through an electrolytic 1.0 microfarad capacitor (162).

SAMPLE AND HOLD UNIT

The sample and hold unit (32) includes the dual operational amplifier (161) noted above. Pin 4 of this amplifier (161) connects to the negative 12.6 volt source (39). Pin 5 connects to pin 6 of the analog switch (153) and also through a series connected electrolytic 15 microfarad capacitor (160) and 100 ohm resistor (163) to the negative 12.6 volt source (39) and through an electrolytic 30 microfarad capacitor (164) to ground. Pins 6 and 7 are connected together and through a 500K ohm variable resistor (166) to ground. Pin 1 connects through a 10K ohm resistor (168) to pin 2 and through a 5.1K ohm resistor (169) to pin 3 of the analog switch (153). Pin 2 of the dual operational amplifier (161) connects to pin 7 of the analog switch (153). Pin 8 connects to the positive 12.6 volt supply (44).

DISPLAY UNIT

Finally, the display unit (33) may be comprised of an ICL7106 EV/Kit liquid crystal display that may be connected to a positive 9 volt source (171). The input to the display unit (33) is obtained through the variable leg of the above noted variable resistor (166).

OPERATION

Having described the components and configuration of the device (10), use of the device to measure rock detachment will now be described.

Referring to FIG. 1, the accelerometer (17) may be appropriately connected to a rock (172), and the rock may be struck with a scaling bar (173). Though any number of variously sized and configured scaling bars could be utilized, the applicant has used a 1.8 meter bar of 318 mm. steel tubing having a chisel point at one end.

Referring again to FIG. 2, vibrations in the rock (172) will be detected by the accelerometer (17) and converted by the accelerometer (17) into an electric signal that is input into the buffer and automatic gain control amplifier (18). The automatic gain control amplification can be as high as positive 40 db., but may be lowered with larger input amplitudes to automatically prevent clipping and distortion of the input wave form.

The amplified signal then splits into two frequency bands as specified by the low band pass filter (21) and the high band pass filter (26). In addition, the universal active filters (48 and 69) have supplemental amplification that they impart to the segregated signals. The low band pass filter (21) serves to segregate that band where most of the resonant energy of detached rocks will be concentrated. The high band pass filter represents a signal range where power from detached and solid rocks are roughly equivalent.

Once the two signal paths have been segregated by frequency, the two signals are separately amplified through the amplifiers (22 and 27), squared through the squarers (23 and 28) and integrated by the integraters (24 and 29). These operations provide a measure of the power contained in the two frequency bands.

It should be noted that the integraters (24 and 29) are activated by a one shot pulse provided by the trigger unit (19). In this way, integration occurs only after the rock (172) has been impacted by the energy source (173).

The two integrated signals are then directed to the differential amplifier (31). This device outputs a voltage proportional to the difference in power contained in the two frequency bands. It is this output which provides a measure of rock stability. This voltage can be directed to the sample and hold unit (32) and subsequently displayed on the liquid crystal display (37).

The trigger unit (19) also receives the original signal from the accelerometer (17). This signal is amplified and full wave rectified, and then amplified again to the point of clipping. The positive going impulse of the resulting essentially square wave signal triggers the dual one shot (142). This in turn controls the analog switches (153) and transistors (106 and 109) which turn the integraters (24 and 29) and sample and hold unit (32) on and off. The trigger unit (19) therefor operates to turn the integraters (24 and 29) and sample and hold unit (32) on only when an impact has been detected.

The comparison scheme serves to minimize the effects of differing overall energy source applications and other potentially interferring or variable conditions. Field tests by the applicant have shown that the device (10) can reliably provide an objective quantitative measure of mine rock detachment while avoiding many of the subjective problems associated with prior art techniques.

Obviously, numerous modifications and variations of the present invention are possible in light of the above teachings. It is therefore to be understood that within the scope of the appended claims, the invention may be practised otherwise than as specifically described therein.

I claim:

1. A detached rock evaluation device comprising:
    (a) energy transducer means for sensing vibrations in rock and for converting said vibrations into electrical signals;
    (b) low band pass filter means for receiving said electrical signals and transmitting only a low frequency segment thereof;
    (c) high band pass filter means for receiving said electrical signals and transmitting only a high frequency segment thereof that comprises a base line signal for comparison with said low frequency segment;
    (d) comparison means for receiving said low frequency segment and said high frequency segment and for determining when said low frequency segment exceeds in power said base line signal;
    (e) trigger means operably attached to said energy transducer means for receiving said electrical signals and for allowing said high frequency segment and said low frequency segment to be received by said comparison means only in response to receiving said electrical signals; and
    (f) display means for displaying indicia of when said low frequency segment exceeds in power said base line signal.

2. The device of claim 1 wherein said low band pass filter means transmits low frequency signals having frequencies no greater than 1,000 hertz.

3. The device of claim 1 wherein said high band pass filter means transmits high frequency signals having frequencies no lower than 3,000 hertz.

4. The device of claim 1 wherein:
    (a) said low band pass filter means includes first integrater means for integrating said low frequency segment; and
    (b) said high band pass filter means includes second integrater means for integrating said high frequency segment.

5. The device of claim 4 wherein:
    (a) said low band pass filter means includes first squarer means for squaring said low frequency segment prior to integration thereof; and
    (b) said high band pass filter means includes second squarer means for squaring said high frequency segment prior to integration thereof.

6. The device of claim 5 wherein:
    (a) said low band pass filter means includes first amplifier means for amplifying said low frequency segment prior to squaring it; and
    (b) said high band pass filter means includes second amplifier means for amplifying said high frequency segment prior to squaring it.

7. The device of claim 4 wherein said trigger means operably attaches to said energy transducer means for receiving said electrical signals for actuating said first and second integrater means in response to receiving said electrical signals.

8. The device of claim 7 wherein said trigger means is operably connected to said display means and actuates said display means in response to sensing said electrical signals.

9. A detached rock evaluation device comprising:
    (a) energy transducer means for sensing vibrations in rock and for converting said vibrations into electrical signals, said means comprising at least in part an accelerometer;
    (b) low band pass filter means for receiving said electrical signals and for transmitting only low frequency signals which are greater in frequency than 200 hertz and less in frequency than 1,000 hertz, and for subsequently squaring and then integrating said low frequency signals;
    (c) high band pass filter means for receiving said electrical signals and transmitting only high frequency signals which are greater in frequency than 3000 hertz and less in frequency than 3,500 hertz, and for subsequently squaring and then integrating said high frequency signals;
    (d) comparison means for receiving said low frequency signals and said high frequency signals and for determining the difference in power between said signals; and
    (e) display means for displaying indicia of said difference.

* * * * *